United States Patent
Wu

(10) Patent No.: US 11,974,179 B2
(45) Date of Patent: Apr. 30, 2024

(54) SECONDARY CELL GROUP MAINTENANCE METHOD, TERMINAL DEVICE, AND NETWORK NODE

(71) Applicant: VIVO MOBILE COMMUNICATION CO.,LTD., Guangdong (CN)

(72) Inventor: Yumin Wu, Chang'an Dongguan (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 133 days.

(21) Appl. No.: 16/975,041

(22) PCT Filed: Feb. 2, 2019

(86) PCT No.: PCT/CN2019/074572
§ 371 (c)(1),
(2) Date: Aug. 21, 2020

(87) PCT Pub. No.: WO2019/161742
PCT Pub. Date: Aug. 29, 2019

(65) Prior Publication Data
US 2020/0396661 A1    Dec. 17, 2020

(30) Foreign Application Priority Data
Feb. 24, 2018   (CN) .......................... 201810157524.X

(51) Int. Cl.
*H04W 36/00* (2009.01)
*H04W 28/086* (2023.01)

(52) U.S. Cl.
CPC ... *H04W 36/00837* (2018.08); *H04W 28/086* (2023.05); *H04W 36/0058* (2018.08); *H04W 36/0094* (2013.01)

(58) Field of Classification Search
CPC ....... H04W 36/00837; H04W 36/0058; H04W 36/0094

(Continued)

(56) References Cited

U.S. PATENT DOCUMENTS

| 10,219,317 B2 | 2/2019 | Lee et al. |
| 2012/0057544 A1 | 3/2012 | Xu et al. |

(Continued)

FOREIGN PATENT DOCUMENTS

| CN | 101547486 A | 9/2009 |
| CN | 101959171 A | 1/2011 |

(Continued)

OTHER PUBLICATIONS

U.S. Appl. No. 62/587,222, filed Nov. 16, 2017.*

(Continued)

*Primary Examiner* — Faisal Choudhury
(74) *Attorney, Agent, or Firm* — Price Heneveld LLP

(57) ABSTRACT

The present disclosure provides a secondary cell group (SCG) maintenance method, a terminal device and a network node. The SCG maintenance method includes: receiving conditional SCG change information transmitted by a network node; evaluating, according to the conditional SCG change information, whether one or more target cells of an SCG meet a condition corresponding to triggering target cell change, to obtain an evaluation result; according to the evaluation result, triggering a SCG target cell changing procedure.

19 Claims, 7 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2014/0126545 A1 | 5/2014 | Tamura et al. | |
| 2017/0055187 A1 | 2/2017 | Kang et al. | |
| 2017/0325133 A1* | 11/2017 | Worrall | H04W 36/0027 |
| 2018/0160336 A1 | 6/2018 | Dai et al. | |
| 2020/0084683 A1* | 3/2020 | Moosavi | H04W 36/24 |
| 2021/0345191 A1* | 11/2021 | Da Silva | H04B 7/0695 |

FOREIGN PATENT DOCUMENTS

| | | | | |
|---|---|---|---|---|
| CN | 101790200 B | | 4/2013 | |
| CN | 103582126 A | | 2/2014 | |
| CN | 106162857 A | | 11/2016 | |
| CN | 106332046 A | | 1/2017 | |
| CN | 106332114 A | | 1/2017 | |
| CN | 104272804 B | * | 12/2017 | ............ H04W 36/30 |
| CN | 107690163 A | | 2/2018 | |
| EP | 3 316 625 A1 | | 5/2018 | |
| WO | 2017/020253 A1 | | 2/2017 | |
| WO | 2017152421 A1 | | 9/2017 | |

OTHER PUBLICATIONS

3GPP TSG-RAN WG2 #99-bis on NR Tdoc R2-1710850; Prague, Czech, Oct. 9-13, 2017.*
U.S. Appl. No. 62/591,519, filed Nov. 28, 2017.*
EP Search Report in Application No. 19757068.2 dated Nov. 25, 2020.
CN Office Action in Application No. 201810157524.X dated May 8, 2020.
"Introduction of LTE-NR Tight Interworking funcationality" Change Request, 3GPP TSG-RAN WG3 Meeting #95bis, Apr. 3, 2017.
Written Opinion and International Search Report in Application No. PCT/CN2019/074572 dated Sep. 3, 2020.
EP Office Action dated Mar. 13, 2023 as received in Application No. 19757068.2.

* cited by examiner

SECONDARY CELL GROUP MAINTENANCE METHOD, TERMINAL DEVICE, AND NETWORK NODE

CROSS-REFERENCE TO RELATED APPLICATION

This application is the U.S. national phase of PCT Application PCT/CN2019/074572 filed on Feb. 2, 2019, which claims the benefit and priority of Chinese Application No. 201810157524.X, filed on Feb. 24, 2018, the disclosures of which are incorporated in their entirety by reference herein.

TECHNICAL FIELD

The present disclosure relates to the field of communications technology, and in particular to a secondary cell group maintenance method, a terminal device and a network node.

BACKGROUND

In the fifth generation (5 Generation, 5G) mobile communication system, a terminal device, such as a user equipment (User Equipment, UE), may adopt a dual connectivity (Dual Connectivity, DC) architecture, including two cell groups, which are a master cell group (Master Cell Group, MCG) and a secondary cell group (Secondary Cell Group, SCG). The MCG is corresponding to a master node (Master Node, MN) at the network side, and the SCG is corresponding to a secondary node (secondary node, SN) at the network side. Specifically, the MCG includes a primary cell (Primary Cell, PCell) and a secondary cell (Secondary Cell, SCell). The SCG includes a primary secondary cell (Primary Secondary Cell, PSCell) and an SCell. The PCell and the PSCell may also be referred to as special Cells (Special Cell, SpCells).

Currently, a main process of UE conditional handover is that: a source node transmits handover request information to one or more target nodes; the target node feeds back handover confirmation information to the source node; the source node transmits configuration information of conditional handover to the UE; the UE evaluates whether candidate cells meet handover conditions, and then selects a target cell for handover if the candidate cells meet the handover conditions; the UE initiates a random access procedure for the selected target cell; the UE transmits handover completion information to the target node; the source node transmits a conditional handover cancel command to other target node; the other target node transmits a conditional handover cancel confirmation command to the source node.

In the DC architecture, the communication system often needs to deploy a large number of small cells and small base stations. At this point, if the condition-based SCG maintenance process in the related art is used, i.e., changing the SCG, a large number of configuration signaling operations are required, which causes signaling loss, and may not be able to change the SCG cell immediately and effectively, resulting in failure of the SCG and interruption of data transmission of the SCG.

SUMMARY

Embodiments of the present disclosure provide a secondary cell group (SCG) maintenance method, a terminal device and a network node, which can solve the problem that the condition-based SCG maintenance method in the related art requires a large number of configuration signaling operations, resulting in signaling loss and that the SCG cell cannot be changed immediately and effectively.

According to a first aspect, one embodiment of the present disclosure provides a secondary cell group (SCG) maintenance method, applied to a terminal device, including:

receiving conditional SCG change information transmitted by a network node;

evaluating, according to the conditional SCG change information, whether one or more target cells of an SCG meet a condition corresponding to triggering target cell change, to obtain an evaluation result;

according to the evaluation result, triggering a SCG target cell changing procedure.

According to a second aspect, one embodiment of the present disclosure provides a secondary cell group (SCG) maintenance method, applied to a network node, including:

transmitting conditional SCG change information to a terminal device;

wherein the conditional SCG change information is used by the terminal device to, according to the conditional SCG change information, evaluate whether one or more target cells of an SCG meet a condition corresponding to triggering target cell change, to obtain an evaluation result, and trigger a SCG target cell changing procedure according to the evaluation result.

According to a third aspect, one embodiment of the present disclosure provides a terminal device, including:

a first receiving module configured to receive conditional SCG change information transmitted by a network node;

an evaluation module configured to, according to the conditional SCG change information, evaluate whether one or more target cells of an SCG meet a condition corresponding to triggering target cell change, to obtain an evaluation result;

a triggering module configured to trigger a SCG target cell changing procedure according to the evaluation result.

According to a fourth aspect, one embodiment of the present disclosure provides a network node, including:

a third transmission module configured to transmit conditional SCG change information to a terminal device;

wherein the conditional SCG change information is used by the terminal device to, according to the conditional SCG change information, evaluate whether one or more target cells of an SCG meet a condition corresponding to triggering target cell change, to obtain an evaluation result, and trigger a SCG target cell changing procedure according to the evaluation result.

According to a fifth aspect, one embodiment of the present disclosure provides a terminal device, including: a memory, a processor, and a computer program stored on the memory and executable on the processor; wherein the computer program is executed by the processor to implement steps of the secondary cell group maintenance method applied to the terminal device.

According to a sixth aspect, one embodiment of the present disclosure provides a network node, comprising: a memory, a processor, and a computer program stored on the memory and executable on the processor; wherein the computer program is executed by the processor to implement steps of the secondary cell group maintenance method applied to the network node.

According to a seventh aspect, one embodiment of the present disclosure provides a computer readable storage medium, including a computer program stored thereon;

wherein the computer program is executed by a processor to implement steps of the above secondary cell group maintenance method.

In embodiments of the present disclosure, the terminal device receives the conditional SCG change information transmitted by the network node; according to the conditional SCG change information, evaluates whether one or more target cells of the SCG meet the condition corresponding to triggering target cell change to obtain the evaluation result; according to the evaluation result, triggers a SCG target cell changing procedure. In this way, the terminal device, on the premise of meeting network configuration conditions, can change the SCG target cell immediately and effectively, thereby reducing the loss of radio interface signaling, reducing the probability of SCG failure, achieving load balance by quickly switching data transmission of the current SCG to other cell groups and then improving utilization efficiency of radio interface resources.

BRIEF DESCRIPTION OF THE DRAWINGS

In order to explain the technical solutions of the embodiments of the present disclosure more clearly, the drawings used in the description of the embodiments of the present disclosure are briefly introduced below. Obviously, the drawings in the following description are just some embodiments of the present disclosure. For those of ordinary skill in the art, other drawings can be obtained based on these drawings without paying creative labor.

DETAILED DESCRIPTION

Figure 1:
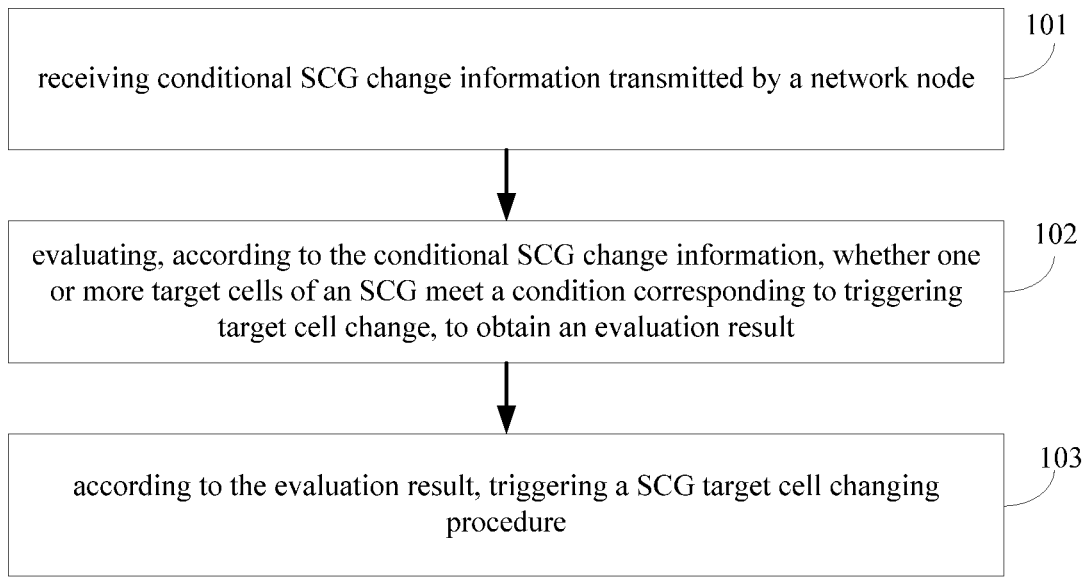
FIG. 1 is a flowchart of a secondary cell group maintenance method according to an embodiment of the present disclosure.

Exemplary embodiments of the present disclosure will be described hereinafter in details with reference to the accompanying drawings. Although the exemplary embodiments of the present disclosure have been shown in the drawings, it should be understood that the present disclosure may be implemented in various forms and should not be limited by the embodiments described herein. On the contrary, these embodiments are provided to enable a more thorough understanding of the present disclosure and to fully convey the scope of the present disclosure to those skilled in the art.

Referring to FIG. 1, one embodiment of the present disclosure provides a secondary cell group maintenance method, which is applied to a terminal device and includes the following steps.

Step 101: receiving conditional SCG change information transmitted by a network node.

The network node may be a master node or a source secondary node.

Step 102: evaluating, according to the conditional SCG change information, whether one or more target cells of an SCG meet a condition corresponding to triggering target cell change, to obtain an evaluation result.

Step 103: according to the evaluation result, triggering a SCG target cell changing procedure.

In the secondary cell group maintenance method according to one embodiment of the present disclosure, the terminal device receives the conditional SCG change information transmitted by the network node; according to the conditional SCG change information, evaluates whether one or more target cells of the SCG meet the condition corresponding to triggering target cell change to obtain the evaluation result; according to the evaluation result, triggers a SCG target cell changing procedure. In this way, the terminal device, on the premise of meeting network configuration conditions, can change the SCG target cell immediately and effectively, thereby reducing the loss of radio interface signaling, reducing the probability of SCG failure, achieving load balance by quickly switching data transmission of the current SCG to other cell groups and then improving utilization efficiency of radio interface resources.

In one embodiment of the present disclosure, the conditional SCG change information may include one or more of the following:

identification information of one or more conditional change target cells;

configuration information of one or more conditional change target cells;

one or more conditions corresponding to triggering target cell change;

one or more condition identification information corresponding to triggering target cell change;

one or more condition action durations corresponding to triggering target cell change.

Further, the condition corresponding to triggering target cell change includes one or more of the following:

a measurement result of a target cell (such as a neighboring cell) reaching or exceeding a preset threshold;

a measurement result of a serving cell (such as a current SCG cell) reaching or below a preset threshold;

a difference between a measurement result of a serving cell (such as a current SCG cell) and a measurement result of a target cell (such as a neighboring cell) reaching or exceeding a preset threshold;

a measurement result of a serving cell (such as a current SCG cell) reaching or below a first preset threshold, and a measurement result of a target cell (such as a neighboring cell) reaching or exceeding a second preset threshold.

It should be understood that the foregoing preset threshold, the first preset threshold and the second preset threshold are preset according to actual conditions, which are not limited in the embodiments of the present disclosure.

Further, the foregoing measurement result may include one or more of the following:

reference symbol received power (Reference Symbol Received Power, RSRP), reference signal received quality (Reference Signal Received Quality, RSRQ), and signal interference noise ratio (Signal Interference Noise Ration, SINR).

In one embodiment of the present disclosure, the triggering a SCG target cell changing procedure may be one or more of the following:

when the conditional SCG change information includes configuration information of one or more conditional change target cells, configuring according to the configuration information of an SCG target cell that meets the condition corresponding to triggering target cell change;

performing downlink synchronization with the SCG target cell that meets the condition corresponding to triggering target cell change;

initiating a random access procedure in the SCG target cell that meets the condition corresponding to triggering target cell change.

Further, after the triggering a SCG target cell changing procedure, the terminal device may also perform one or more of the following:

stopping evaluation of whether one or more target cells of the SCG meet the condition corresponding to triggering target cell change;

deleting one or more conditions corresponding to triggering target cell change;

deleting configuration information of one or more conditional change target cells, which are not changed (or referred to as unused).

In one embodiment of the present disclosure, when the network side configures condition action durations corresponding to triggering target cell change, that is, the conditional SCG change information transmitted by the network node includes one or more conditions and one or more condition action durations corresponding to triggering target cell change, the foregoing step 102 may include:

starting a timer for each condition corresponding to triggering target cell change, where the duration of the timer is one of the condition action durations corresponding to triggering target cell change;

before the timer expires, evaluating whether the corresponding target cell meets the condition corresponding to triggering target cell change to obtain the evaluation result; that is, after the timer expires, the terminal device no longer performs evaluation and determination for the corresponding target cell.

Further, in the case that at least one timer is started, the terminal device may also perform one or more of the following:

when the conditional SCG change information includes one or more condition identification information corresponding to triggering target cell change, and when one or more timers (including all timers) of the at least one timer expire, deleting, the condition identification information corresponding to triggering target cell change, which is corresponding to the timer that has expired;

when the conditional SCG change information includes the configuration information of one or more conditional change target cells, and when one or more timers (including all timers) of the at least one timer expire, deleting, the configuration information of the conditional change target cell, which is corresponding to the timer that has expired.

In one embodiment of the present disclosure, after receiving the conditional SCG change information transmitted by the network node, the terminal device may further transmit configuration confirmation information to the network node.

The configuration confirmation information is used by the network node to determine corresponding conditional SCG change confirmation information. Content included in the conditional SCG change confirmation information may be the same as content included in the configuration confirmation information.

Optionally, the configuration confirmation information may include one or more of the following:

information of rejecting conditional SCG change;
information of agreeing to conditional SCG change.

Optionally, the information of rejecting conditional SCG change includes one or more of the following:

identification information of one or more rejected conditional change target cells;

one or more rejected conditions corresponding to triggering target cell change.

Optionally, the information of agreeing to conditional SCG change includes one or more of the following:

identification information of one or more agreed conditional change target cells;

configuration information of one or more agreed conditional change target cells;

one or more agreed conditions corresponding to triggering target cell change.

In one embodiment of the present disclosure, after the evaluation result is obtained, the terminal device may further transmit a notification message to the master node or the source secondary node. The notification message is used to notify the master node or the source secondary node of related information of the SCG changed by the terminal device.

Optionally, the related information of the SCG changed by the terminal device includes one or more of the following:

identification information of one or more conditional change target cells;

one or more satisfied condition identification information corresponding to triggering target cell change;

configuration information of one or more target cells that meet conditional change.

Figure 2:
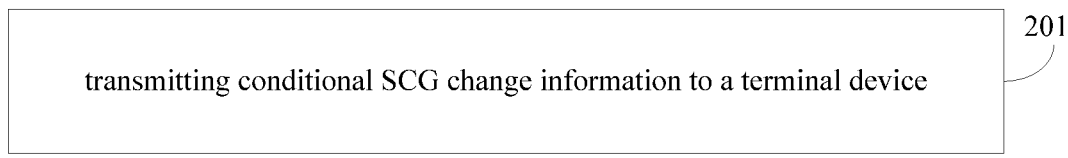
FIG. 2 is a flowchart of another secondary cell group maintenance method according to an embodiment of the present disclosure.

Referring to FIG. 2, one embodiment of the present disclosure further provides a secondary cell group maintenance method, which is applied to a network node and includes the following steps.

Step 201: transmitting conditional SCG change information to a terminal device.

The conditional SCG change information is used by the terminal device to, according to the conditional SCG change information, evaluate whether one or more target cells of an SCG meet a condition corresponding to triggering target cell change, to obtain an evaluation result, and trigger a SCG target cell changing procedure according to the evaluation result.

In the secondary cell group maintenance method according to one embodiment of the present disclosure, the conditional SCG change information is transmitted to the terminal device, so that the terminal device, according to the conditional SCG change information, evaluates whether one or more target cells of the SCG meet the condition corresponding to triggering target cell change to obtain the evaluation result, and triggers the SCG target cell changing procedure according to the evaluation result. In this way, the terminal device, on the premise of meeting network configuration conditions, can change the SCG target cell immediately and effectively, thereby reducing the loss of radio interface signaling, reducing the probability of SCG failure, achieving load balance by quickly switching data transmission of the current SCG to other cell groups and then improving utilization efficiency of radio interface resources.

In one embodiment of the present disclosure, the network node may be a master node or a source secondary node.

Further, the network node is a master node. Before the step 201, the method further includes:

transmitting conditional SCG addition request information to a target secondary node;

receiving conditional SCG addition feedback information transmitted by the target secondary node.

The conditional SCG addition feedback information is used by the master node to determine corresponding conditional SCG change information. The number of target secondary node may be one or more.

Optionally, the conditional SCG addition request information includes one or more of the following:

identification information of one or more conditional addition target cells;

one or more conditions corresponding to triggering target cell addition;

one or more condition identification information corresponding to triggering target cell addition;

one or more condition action duration corresponding to triggering target cell addition.

Optionally, the condition corresponding to triggering target cell addition includes one or more of the following:

a measurement result of a target cell (such as a neighboring cell) reaching or exceeding a preset threshold;

a measurement result of a serving cell (such as a current SCG cell) reaching or below a preset threshold;

a difference between a measurement result of a serving cell (such as a current SCG cell) and a measurement result of a target cell (such as a neighboring cell) reaching or exceeding a preset threshold;

a measurement result of a serving cell (such as a current SCG cell) reaching or below a first preset threshold, and a measurement result of a target cell (such as a neighboring cell) reaching or exceeding a second preset threshold.

Optionally, the measurement result includes one or more of the following: RSRP, RSRQ, and SINR.

Optionally, the conditional SCG addition feedback information includes one or more of the following:

information of rejecting conditional SCG addition;

information of agreeing to conditional SCG addition.

Optionally, the information of rejecting conditional SCG addition includes one or more of the following:

identification information of one or more rejected conditional addition target cells;

one or more rejected conditions corresponding to triggering target cell addition.

Optionally, the information of agreeing to conditional SCG addition includes one or more of the following:

identification information of one or more agreed conditional addition target cells;

configuration information of one or more agreed conditional addition target cells;

one or more agreed conditions corresponding to triggering target cell addition;

one or more agreed condition action durations corresponding to triggering target cell addition.

Further, before the transmitting conditional SCG addition request information to a target secondary node, the method further includes:

receiving conditional SCG change request information transmitted by the source secondary node;

where the conditional SCG change request information is used by the master node to determine the corresponding conditional SCG addition request information. The number of the source secondary node may be one or more.

Optionally, the conditional SCG change request information includes one or more of the following:

identification information of one or more conditional change target cells;

one or more conditions corresponding to triggering target cell change;

one or more condition identification information corresponding to triggering target cell change;

one or more condition action durations corresponding to triggering target cell change.

Further, the network node is a master node. Before the step 201, the method further includes:

transmitting conditional SCG release indication information to a source secondary node; where the conditional SCG release indication information is used by the source secondary node to conditionally release SCG cells;

receiving conditional SCG release confirmation information transmitted by the source secondary node.

Further, the network node is a master node. After the step 201, the method further includes:

receiving configuration confirmation information transmitted by the terminal device;

according to the configuration confirmation information, transmitting conditional SCG change confirmation information to a source secondary node and a target secondary node.

Further, the network node is a source secondary node, and after the step 201, the method further includes:

receiving configuration confirmation information transmitted by the terminal device;

according to the configuration confirmation information, transmitting conditional SCG change confirmation information to a source secondary node and a target secondary node.

Further, the network node is a master node. After the step 201, the method further includes:

receiving conditional SCG change indication information transmitted by the target secondary node;

where the conditional SCG change indication information is transmitted by the target secondary node after the target secondary node detects that the terminal device accesses the target cell, and is used to indicate conditional change target cells.

Optionally, the conditional SCG change indication information includes one or more of the following:

identification information of the terminal device;

identification information of one or more target cells that meet conditional change;

configuration information of one or more target cells that meet conditional change;

identification information of target cells.

Further, the network node is a master node. After the step 201, the method further includes:

transmitting a release request message to a source secondary node;

where the release request message is used by the source secondary node to release resources corresponding to a source SCG cell of the terminal device;

receiving a release confirmation message transmitted by the source secondary node.

Further, the network node is a source secondary node. After the step 201, the method further includes:

receiving a release request message transmitted by a master node;

where the release request message is used by the source secondary node to release resources corresponding to a source SCG cell of the terminal device;

transmitting a release confirmation message to the master node.

Further, the network node is a master node. After the step 201, the method further includes:

transmitting cancellation conditional SCG addition related information to the target secondary node;

where the cancellation conditional SCG addition related information is used by the target secondary node to cancel resources reserved for corresponding conditional SCG addition.

Optionally, the cancellation conditional SCG addition related information includes one or more of the following:

identification information of one or more canceled conditional addition target cells;

one or more canceled condition identification information corresponding to triggering target cell addition;

configuration information of one or more canceled conditional addition target cells;

identification information of the terminal device.

Further, the network node is a master node. After the step 201, the method further includes:

receiving cancellation conditional SCG addition related information transmitted by a target secondary node;

where the cancellation conditional SCG addition related information is used by the master node to confirm cancellation of corresponding conditional addition SCG cells.

Optionally, the cancellation conditional SCG addition related information includes one or more of the following:

identification information of one or more canceled conditional addition target cells;

one or more canceled condition identification information corresponding to triggering target cell addition;

configuration information of one or more canceled conditional addition target cells;

identification information of the terminal device.

Further, after the step 201, the method further includes:

transmitting configuration update information to the terminal device;

where the configuration update information is used by the terminal device to cancel corresponding conditional SCG addition related information.

Optionally, the configuration update information includes one or more of the following:

identification information of one or more canceled conditional addition target cells;

one or more canceled condition identification information corresponding to triggering target cell addition;

configuration information of one or more canceled conditional addition target cells.

Further, the network node is a master node. After the step 201, the method further includes:

transmitting cancellation conditional SCG change related information to a source secondary node; where the cancellation conditional SCG change related information is used by the source secondary node to confirm cancellation of corresponding conditional SCG change cell; or, receiving cancellation conditional SCG change related information transmitted by the source secondary node; where the cancellation conditional SCG change related information is used by the master node to confirm cancellation of corresponding conditional SCG change cell.

Further, the network node is a source secondary node. After the step 201, the method further includes:

transmitting cancellation conditional SCG change related information to a master node; where the cancellation conditional SCG change related information is used by the master node to confirm cancellation of corresponding conditional SCG change cell; or, receiving cancellation conditional SCG change related information transmitted by the master node; where the cancellation conditional SCG change related information is used by the source secondary node to confirm cancellation of corresponding conditional SCG change cell.

Optionally, the cancellation conditional SCG change related information includes one or more of the following:

identification information of one or more canceled conditional change target cells;

one or more canceled condition identification information corresponding to triggering target cell change;

configuration information of one or more canceled conditional change target cells;

identification information of the terminal device.

Condition-based SCG maintenance process according to first to fourth examples of the present disclosure will be described hereinafter with reference to FIG. 3 to FIG. 6.

First Example

Figure 3:
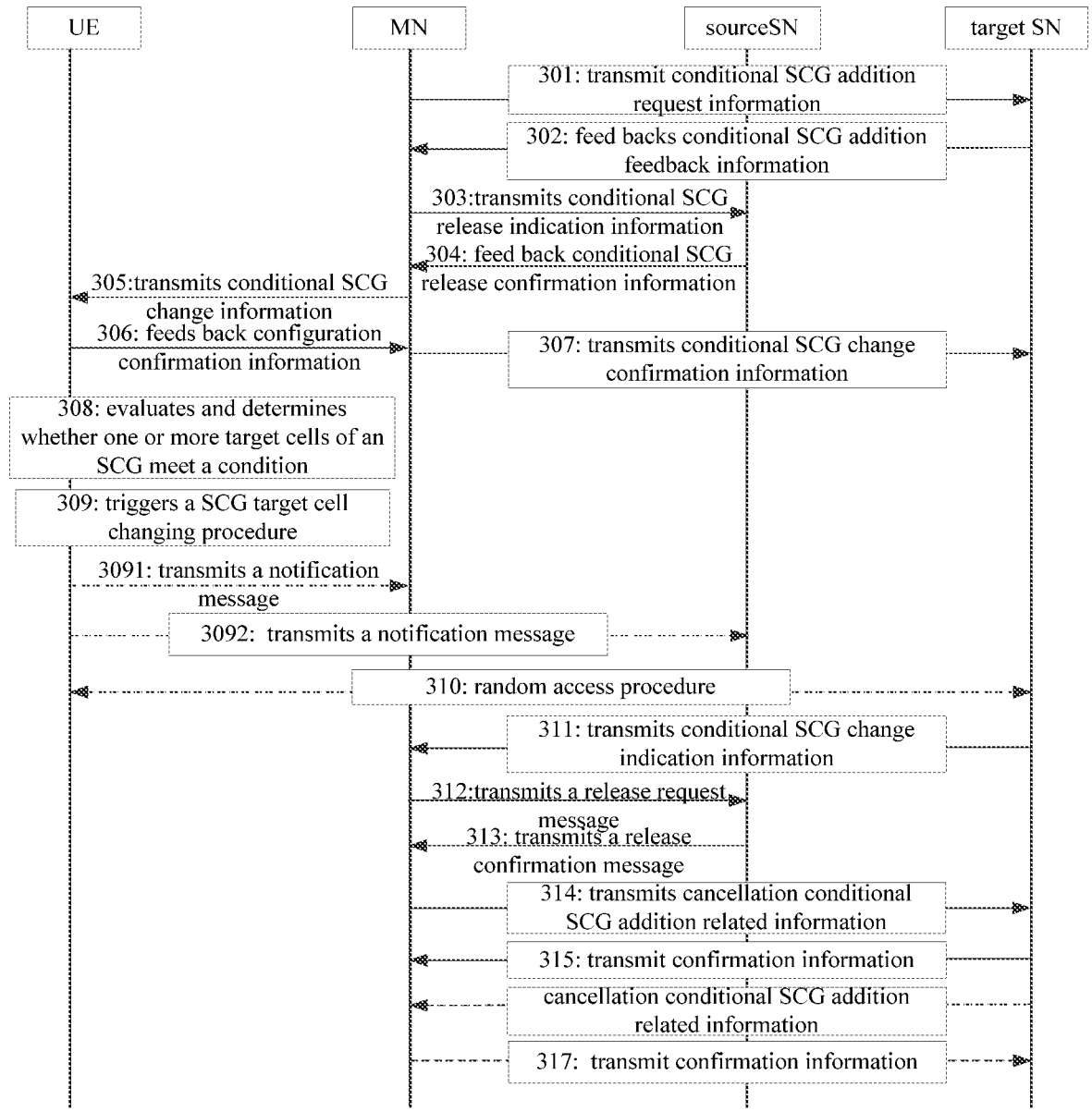
FIG. 3 is a flowchart of a secondary cell group maintenance process according to a first example of the present disclosure.

In the first example, the condition-based SCG maintenance process is triggered by MN, and radio interface configuration information is transmitted to UE through MN (MCG). Referring to FIG. 3, the SCG maintenance process includes the following steps.

Step 301: the MN transmits conditional SCG addition request information to a target SN; where content included in this conditional SCG addition request information may refer to the content included in the above conditional SCG addition request information; the number of the target SN may be one or more.

Step 302: the target SN feeds backs conditional SCG addition feedback information to the MN; where content of the conditional SCG addition feedback information may refer to the content of the above conditional SCG addition feedback information.

Step 303: the MN transmits conditional SCG release indication information to a source SN; where the number of the source SN may be one or more.

Step 304: the source SN conditionally releases an SCG cell according to the received conditional SCG release indication information, and feeds back conditional SCG release confirmation information to the MN.

Step 305: the MN transmits conditional SCG change information (this information may be transmitted through an RRC connection reconfiguration message, i.e., radio interface configuration information) to UE; where content included in this conditional SCG change information may refer to the content included in the above conditional SCG change information.

Step 306: the UE feeds back configuration confirmation information (this information may be fed back through an RRC connection reconfiguration complete message) to the MN; where content included in the configuration confirmation information may refer to the content included in the above configuration confirmation information.

Step 307: according to the received configuration confirmation information, the MN transmits conditional SCG change confirmation information (this information may be transmitted through an RRC connection reconfiguration complete message) to the target SN; where content included in the conditional SCG change confirmation information may be the same as the content included in the configuration confirmation information.

Step 308: according to the received conditional SCG change information, the UE evaluates and determines whether one or more target cells of an SCG meet a condition corresponding to triggering target cell change, to obtain an evaluation result.

Step 309: according to the obtained evaluation result, the UE triggers a SCG target cell changing procedure.

The SCG target cell changing procedure may include one or more of the following:

when the conditional SCG change information includes configuration information of one or more conditional change target cells, configuring according to the configuration information of an SCG target cell that meets the condition corresponding to triggering target cell change;

performing downlink synchronization with the SCG target cell that meets the condition corresponding to triggering target cell change;

initiating a random access procedure in the SCG target cell that meets the condition corresponding to triggering target cell change (such as step 310 shown in FIG. 3).

Additionally, step 3091: after obtaining the evaluation result, the UE transmits a notification message to the MN through MCG; where the notification message is used to notify the MN of related information of the SCG changed by the UE; where content included in the related information of the changed SCG may refer to the content included in the above related information of the SCG changed by the terminal device.

Additionally, step 3092: after obtaining the evaluation result, the UE transmits a notification message to the source SN through the SCG; where the notification message is used to notify the source SN of related information of the SCG changed by the UE, so that the source SN deletes SCG related configuration information of the UE after receiving the notification message; where content included in the related information of the changed SCG may refer to the content included in the above related information of the SCG changed by the terminal device.

Step 311: after the target SN detects that the UE accesses the target cell, the target SN transmits conditional SCG change indication information to the MN; where content included in the conditional SCG change indication information may refer to the content included in the above conditional SCG change indication information.

Step 312: the MN transmits a release request message to the source SN, so that the source SN releases resources corresponding to the source SCG cell of the UE.

Step 313: the source SN transmits a release confirmation message to the MN, to confirm that the resources corresponding to the source SCG cell of the UE is released.

Step 314: the MN transmits cancellation conditional SCG addition related information to the target SN; where content included in the cancellation conditional SCG addition related information may refer to the content included in the above cancellation conditional SCG addition related information.

Step 315: according to the received cancellation conditional SCG addition related information, the target SN cancels resources reserved for corresponding conditional SCG addition, and may transmit confirmation information to the MN to confirm cancellation of the corresponding conditional SCG addition.

The step 314 and the step 315 may be initiated at any time after the step 302.

Step 316: the target SN transmits cancellation conditional SCG addition related information to the MN; where content included in the cancellation conditional SCG addition related information may refer to the content of the above cancellation conditional SCG addition related information.

Step 317: according to the received cancellation conditional SCG addition related information, the MN confirms cancellation of the corresponding conditional SCG addition, and may transmit confirmation information to the target SN.

The step 316 and the step 317 may be initiated at any time after the step 302.

Additionally, the MN may transmit configuration update information to the UE (this process may use the same message type as the step 305), so that the UE cancels corresponding conditional SCG addition related information; where content included in the configuration update information may refer to the content included in the above configuration update information.

In the foregoing first example, the radio interface configuration information is transmitted to the UE through the MN, but in addition to this transmission mode, the radio interface configuration information may also be transmitted to the UE through the source SN, such as the second example.

Second Example

Figure 4:
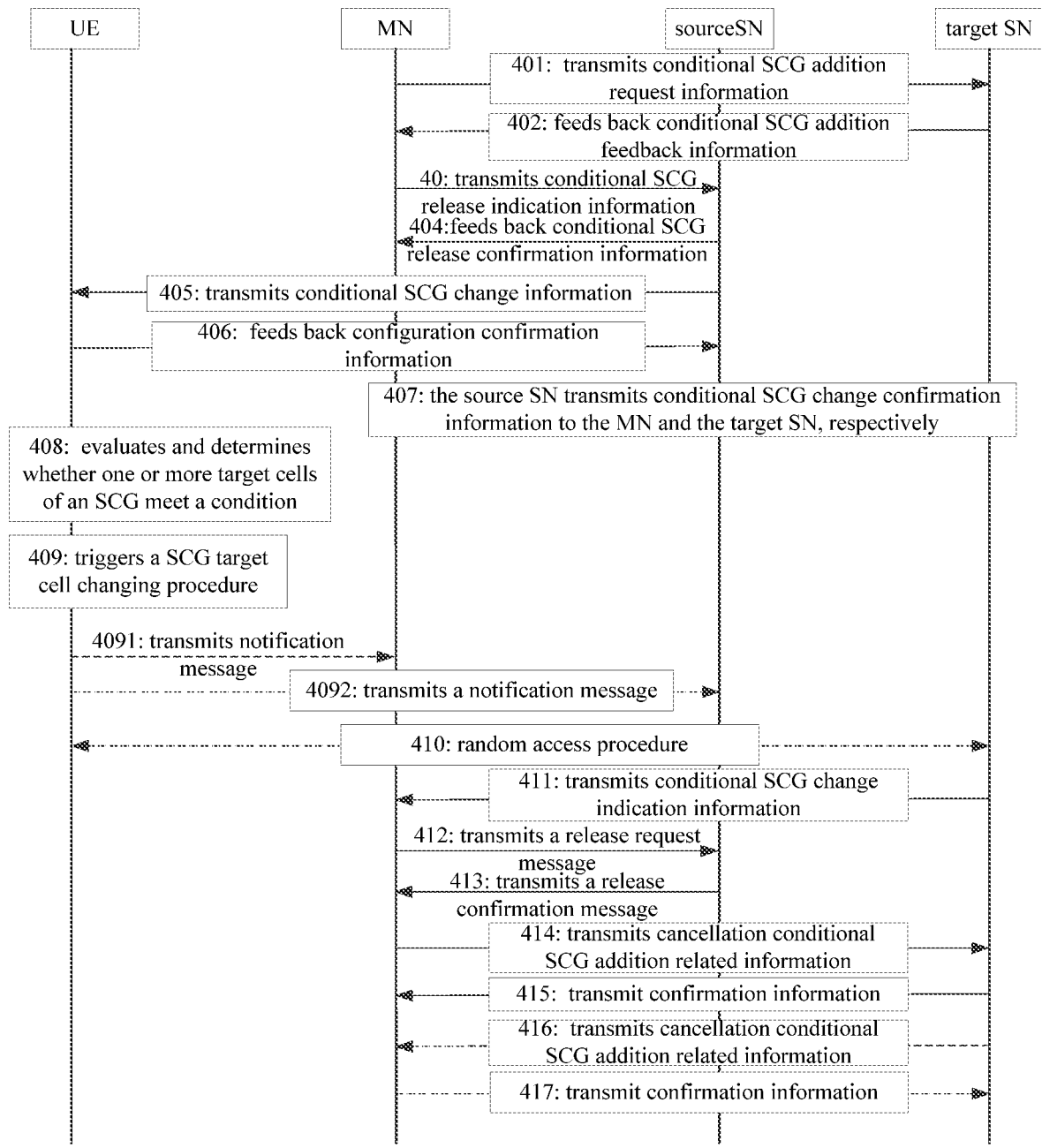
FIG. 4 is a flowchart of a secondary cell group maintenance process according to a second example of the present disclosure.

In the second example, a condition-based SCG maintenance process is triggered by a MN, and radio interface configuration information is transmitted to a UE through a source SN (SCG). Referring to FIG. 4, the SCG maintenance process includes the following steps.

Step 401: MN transmits conditional SCG addition request information to a target SN; where content included in the conditional SCG addition request information may refer to the content included in the above conditional SCG addition request information; the number of the target SN may be one or more.

Step 402: the target SN feeds back conditional SCG addition feedback information to the MN; where content of the conditional SCG addition feedback information may refer to the content of the above conditional SCG addition feedback information.

Step 403: the MN transmits conditional SCG release indication information to the source SN; where the number of the source SN may be one or more.

Step 404: the source SN conditionally releases an SCG cell according to the received conditional SCG release indication information, and feeds back conditional SCG release confirmation information to the MN.

Step 405: the source SN transmits conditional SCG change information (this information may be transmitted through an RRC connection reconfiguration message, i.e., radio interface configuration information) to UE; where content included in this conditional SCG change information may refer to the content included in the above conditional SCG change information.

Step 406: the UE feeds back configuration confirmation information (this information may be fed back through an RRC connection reconfiguration complete message) to the source SN; where content included in the configuration confirmation information may refer to the content included in the above configuration confirmation information.

Step 407: according to the received configuration confirmation information, the source SN transmits conditional SCG change confirmation information (this information may be transmitted through an RRC connection reconfiguration complete message) to the MN and the target SN, respectively; where content included in the conditional SCG change confirmation information may be the same as the content included in the configuration confirmation information.

Step 408: according to the received conditional SCG change information, the UE evaluates and determines whether one or more target cells of an SCG meet a condition corresponding to triggering target cell change, to obtain an evaluation result.

Step 409: according to the obtained evaluation result, the UE triggers a SCG target cell changing procedure.

The SCG target cell changing procedure may include one or more of the following:

when the conditional SCG change information includes configuration information of one or more conditional change target cells, configuring according to the configuration information of an SCG target cell that meets the condition corresponding to triggering target cell change;

performing downlink synchronization with the SCG target cell that meets the condition corresponding to triggering target cell change;

initiating a random access procedure in the SCG target cell that meets the condition corresponding to triggering target cell change (such as step 410 shown in FIG. 4).

Additionally, step 4091: after obtaining the evaluation result, the UE transmits a notification message to the MN through MCG; where the notification message is used to notify the MN of related information of the SCG changed by the UE; where content included in the related information of the changed SCG may refer to the content included in the above related information of the SCG changed by the terminal device.

Additionally, step 4092: after obtaining the evaluation result, the UE transmits a notification message to the source SN through the SCG; where the notification message is used to notify the source SN of related information of the SCG changed by the UE, so that the source SN deletes SCG related configuration information of the UE after receiving the notification message; where content included in the related information of the changed SCG may refer to the content included in the above related information of the SCG changed by the terminal device.

Step 411: after the target SN detects that the UE accesses the target cell, the target SN transmits conditional SCG change indication information to the MN; where content included in the conditional SCG change indication information may refer to the content included in the above conditional SCG change indication information.

Step 412: the MN transmits a release request message to the source SN, so that the source SN releases resources corresponding to the source SCG cell of the UE.

Step 413: the source SN transmits a release confirmation message to the MN, to confirm that the resources corresponding to the source SCG cell of the UE is released.

Step 414: the MN transmits cancellation conditional SCG addition related information to the target SN; where content included in the cancellation conditional SCG addition related information may refer to the content included in the above cancellation conditional SCG addition related information.

Step 415: according to the received cancellation conditional SCG addition related information, the target SN cancels resources reserved for corresponding conditional SCG addition, and may transmit confirmation information to the MN to confirm cancellation of the corresponding conditional SCG addition.

The step 414 and the step 415 may be initiated at any time after the step 402.

Step 416: the target SN transmits cancellation conditional SCG addition related information to the MN; where content included in the cancellation conditional SCG addition related information may refer to the content of the above cancellation conditional SCG addition related information.

Step 417: according to the received cancellation conditional SCG addition related information, the MN confirms cancellation of the corresponding conditional SCG addition, and may transmit confirmation information to the target SN.

The step 416 and the step 417 may be initiated at any time after the step 402.

Additionally, the source SN may transmit configuration update information to the UE (this process may use the same message type as the step 405), so that the UE cancels corresponding conditional SCG addition related information; where content included in the configuration update information may refer to the content included in the above configuration update information.

In the foregoing first example and second example, the SCG maintenance process is triggered by the MN, but in addition to this trigger mode, the SCG maintenance process may also be triggered by the source SN, such as the third example and the fourth example. In the third example, the radio interface configuration information is transmitted to the UE through the MN; in the fourth example, the radio interface configuration information is transmitted to the UE through the source SN.

Third Example

Figure 5:
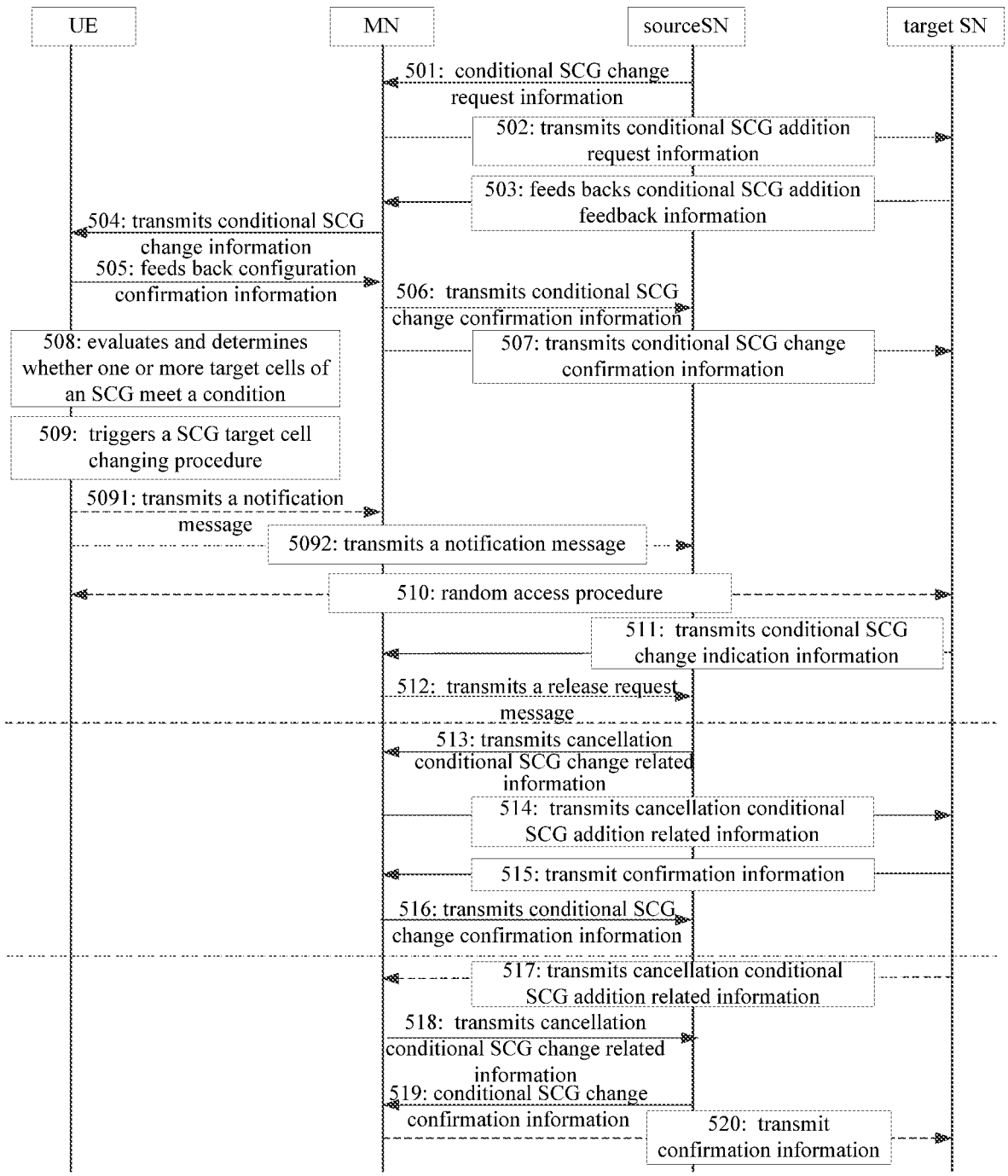
FIG. 5 is a flowchart of a secondary cell group maintenance process according to a third example of the present disclosure.

In the third example, a condition-based SCG maintenance process is triggered by a source SN, radio interface configuration information is transmitted to a UE through a MN (MCG). Referring to FIG. 5, the SCG maintenance process includes the following steps.

Step 501: the source SN transmits conditional SCG change request information to the MN; where content included in this conditional SCG change request information may refer to the content included in the above conditional SCG change request information; the number of the source SN may be one or more.

Step 502: the MN transmits conditional SCG addition request information to a target SN; where content included in this conditional SCG addition request information may refer to the content included in the above conditional SCG addition request information; the number of the target SN may be one or more.

Step 503: the target SN feeds backs conditional SCG addition feedback information to the MN; where content of the conditional SCG addition feedback information may refer to the content of the above conditional SCG addition feedback information.

Step 504: the MN transmits conditional SCG change information (this information may be transmitted through an RRC connection reconfiguration message, i.e., radio interface configuration information) to UE; where content included in this conditional SCG change information may refer to the content included in the above conditional SCG change information.

Step 505: the UE feeds back configuration confirmation information (this information may be fed back through an RRC connection reconfiguration complete message) to the MN; where content included in the configuration confirmation information may refer to the content included in the above configuration confirmation information.

Step 506: according to the received configuration confirmation information, the MN transmits conditional SCG change confirmation information to the source SN; where content included in the conditional SCG change confirmation information may be the same as the content included in the configuration confirmation information.

Step 507: according to the received configuration confirmation information, the MN transmits conditional SCG change confirmation information (this information may be transmitted through an RRC connection reconfiguration complete message) to the target SN; where content included in the conditional SCG change confirmation information may be the same as the content included in the configuration confirmation information.

Step 508: according to the received conditional SCG change information, the UE evaluates and determines whether one or more target cells of an SCG meet a condition corresponding to triggering target cell change, to obtain an evaluation result.

Step 509: according to the obtained evaluation result, the UE triggers a SCG target cell changing procedure.

The SCG target cell changing procedure may include one or more of the following:

when the conditional SCG change information includes configuration information of one or more conditional change target cells, configuring according to the configuration information of an SCG target cell that meets the condition corresponding to triggering target cell change;

performing downlink synchronization with the SCG target cell that meets the condition corresponding to triggering target cell change;

initiating a random access procedure in the SCG target cell that meets the condition corresponding to triggering target cell change (such as step 510 shown in FIG. 5).

Additionally, step 5091: after obtaining the evaluation result, the UE transmits a notification message to the MN through MCG; where the notification message is used to notify the MN of related information of the SCG changed by the UE; where content included in the related information of the changed SCG may refer to the content included in the above related information of the SCG changed by the terminal device.

Additionally, step 5092: after obtaining the evaluation result, the UE transmits a notification message to the source SN through the SCG; where the notification message is used to notify the source SN of related information of the SCG changed by the UE, so that the source SN deletes SCG related configuration information of the UE after receiving the notification message; where content included in the related information of the changed SCG may refer to the content included in the above related information of the SCG changed by the terminal device.

Step 511: after the target SN detects that the UE accesses the target cell, the target SN transmits conditional SCG change indication information to the MN; where content included in the conditional SCG change indication information may refer to the content included in the above conditional SCG change indication information.

Step 512: the MN transmits a release request message to the source SN, so that the source SN releases resources corresponding to the source SCG cell of the UE.

Step 513: the source SN transmits cancellation conditional SCG change related information to the MN; where content included in the cancellation conditional SCG change related information may refer to the content included in the above cancellation conditional SCG change related information.

Step 514: the MN transmits cancellation conditional SCG addition related information to the target SN; where content included in the cancellation conditional SCG addition related information may refer to the content included in the above cancellation conditional SCG addition related information.

Step 515: according to the received cancellation conditional SCG addition related information, the target SN cancels resources reserved for corresponding conditional SCG addition, and may transmit confirmation information to the MN to confirm cancellation of the corresponding conditional SCG addition.

Step 516: the MN transmits conditional SCG change confirmation information to the source SN to confirm cancellation of the corresponding conditional SCG change.

The step 513 and the step 516 may be initiated at any time after the step 501.

Step 517: the target SN transmits cancellation conditional SCG addition related information to the MN; where content included in the cancellation conditional SCG addition related information may refer to the content of the above cancellation conditional SCG addition related information.

Step 518: the MN transmits cancellation conditional SCG change related information to the source SN; where content included in the cancellation conditional SCG change related information may refer to the content of the above cancellation conditional SCG change related information.

Step 519: the source SN transmits conditional SCG change confirmation information to the MN to confirm of cancellation of the corresponding conditional SCG change.

Step 520: according to the received cancellation conditional SCG addition related information, the MN confirms cancellation of the corresponding conditional SCG addition, and may transmit confirmation information to the target SN.

The step 517 and the step 520 may be initiated at any time after the step 503.

Fourth Example

Figure 6:
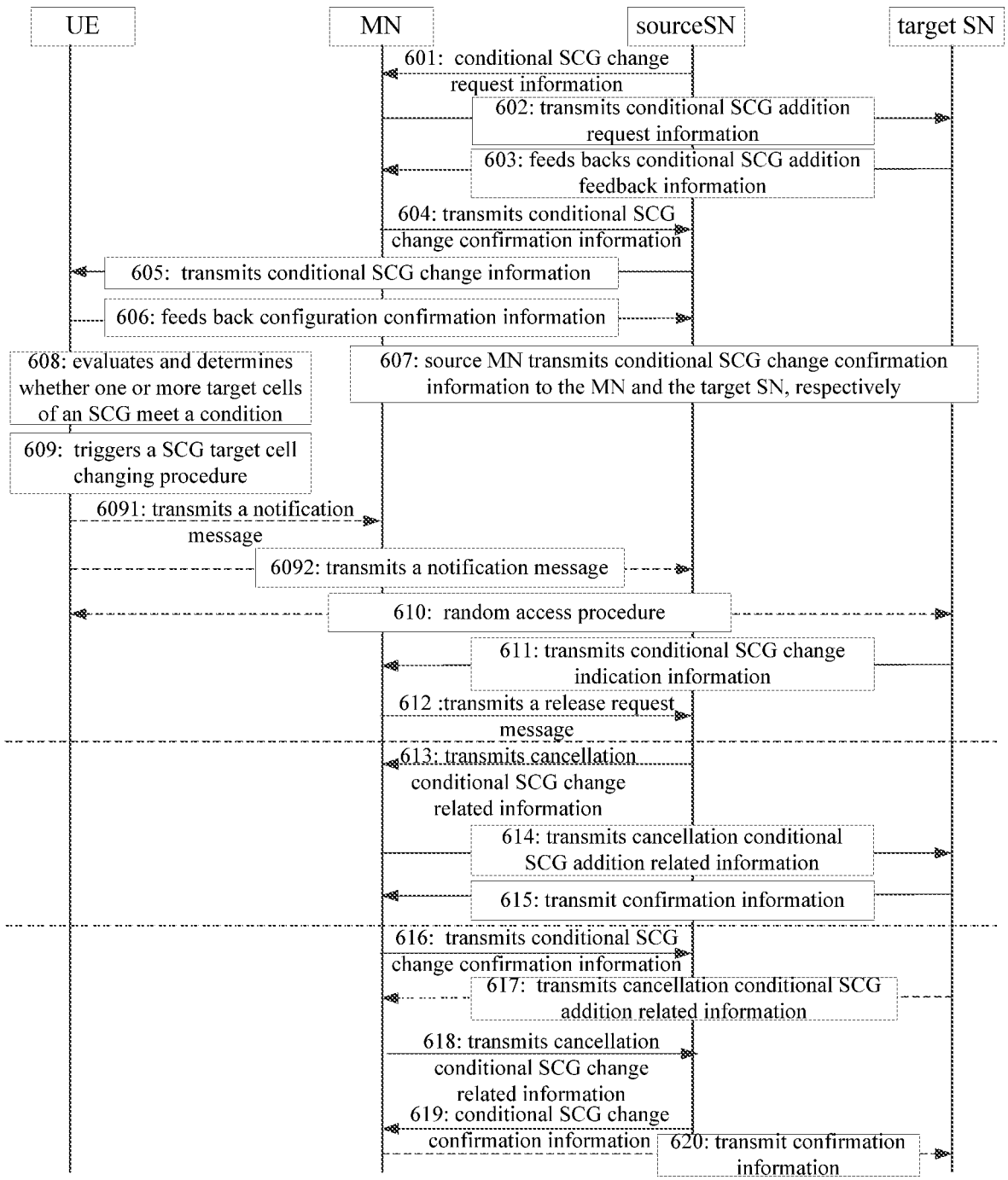
FIG. 6 is a flowchart of a secondary cell group maintenance process according to a fourth example of the present disclosure.

In the fourth example, a condition-based SCG maintenance process is triggered by a SN, radio interface configuration information is transmitted to a UE through the SN (SCG). Referring to FIG. 6, the SCG maintenance process includes the following steps.

Step 601: the source SN transmits conditional SCG change request information to the MN; where content included in this conditional SCG change request information may refer to the content included in the above conditional SCG change request information; the number of the source SN may be one or more.

Step 602: the MN transmits conditional SCG addition request information to a target SN; where content included in this conditional SCG addition request information may refer to the content included in the above conditional SCG addition request information; the number of the target SN may be one or more.

Step 603: the target SN feeds backs conditional SCG addition feedback information to the MN; where content of the conditional SCG addition feedback information may refer to the content of the above conditional SCG addition feedback information.

Step 604: according to the received information, the MN transmits conditional SCG change confirmation information to the source SN; where content included in the conditional SCG change confirmation information may refer to the content included in the above conditional SCG change confirmation information.

Step 605: the source SN transmits conditional SCG change information (this information may be transmitted through an RRC connection reconfiguration message, i.e., radio interface configuration information) to UE; where content included in this conditional SCG change information may refer to the content included in the above conditional SCG change information.

Step 606: the UE feeds back configuration confirmation information (this information may be fed back through an RRC connection reconfiguration complete message) to the source SN; where content included in the configuration confirmation information may refer to the content included in the above configuration confirmation information.

Step 607: according to the received configuration confirmation information, the source MN transmits conditional SCG change confirmation information to the MN and the target SN, respectively; where content included in the conditional SCG change confirmation information may be the same as the content included in the configuration confirmation information.

Step 608: according to the received conditional SCG change information, the UE evaluates and determines whether one or more target cells of an SCG meet a condition corresponding to triggering target cell change, to obtain an evaluation result.

Step 609: according to the obtained evaluation result, the UE triggers a SCG target cell changing procedure.

The SCG target cell changing procedure may include one or more of the following:

when the conditional SCG change information includes configuration information of one or more conditional change target cells, configuring according to the configuration information of an SCG target cell that meets the condition corresponding to triggering target cell change;

performing downlink synchronization with the SCG target cell that meets the condition corresponding to triggering target cell change;

initiating a random access procedure in the SCG target cell that meets the condition corresponding to triggering target cell change (such as step 610 shown in FIG. 6).

Additionally, step 6091: after obtaining the evaluation result, the UE transmits a notification message to the MN through MCG; where the notification message is used to notify the MN of related information of the SCG changed by the UE; where content included in the related information of the changed SCG may refer to the content included in the above related information of the SCG changed by the terminal device.

Additionally, step 6092: after obtaining the evaluation result, the UE transmits a notification message to the source SN through the SCG; where the notification message is used to notify the source SN of related information of the SCG changed by the UE, so that the source SN deletes SCG related configuration information of the UE after receiving the notification message; where content included in the related information of the changed SCG may refer to the content included in the above related information of the SCG changed by the terminal device.

Step 611: after the target SN detects that the UE accesses the target cell, the target SN transmits conditional SCG change indication information to the MN; where content included in the conditional SCG change indication information may refer to the content included in the above conditional SCG change indication information.

Step 612: the MN transmits a release request message to the source SN, so that the source SN releases resources corresponding to the source SCG cell of the UE.

Step 613: the source SN transmits cancellation conditional SCG change related information to the MN; where content included in the cancellation conditional SCG change related information may refer to the content included in the above cancellation conditional SCG change related information.

Step 614: the MN transmits cancellation conditional SCG addition related information to the target SN; where content included in the cancellation conditional SCG addition related information may refer to the content included in the above cancellation conditional SCG addition related information.

Step 615: according to the received cancellation conditional SCG addition related information, the target SN cancels resources reserved for corresponding conditional SCG addition, and may transmit confirmation information to the MN to confirm cancellation of the corresponding conditional SCG addition.

Step 616: the MN transmits conditional SCG change confirmation information to the source SN to confirm cancellation of the corresponding conditional SCG change.

The step 613 and the step 616 may be initiated at any time after the step 601.

Step 617: the target SN transmits cancellation conditional SCG addition related information to the MN; where content included in the cancellation conditional SCG addition related information may refer to the content of the above cancellation conditional SCG addition related information.

Step 618: the MN transmits cancellation conditional SCG change related information to the source SN; where content included in the cancellation conditional SCG change related information may refer to the content of the above cancellation conditional SCG change related information.

Step 619: the source SN transmits conditional SCG change confirmation information to the MN to confirm of cancellation of the corresponding conditional SCG change.

Step 620: according to the received cancellation conditional SCG addition related information, the MN confirms cancellation of the corresponding conditional SCG addition, and may transmit confirmation information to the target SN.

The step 617 and the step 620 may be initiated at any time after the step 603.

The secondary cell group maintenance method of the present disclosure is described in the foregoing embodiments. A terminal device and a network node of the present disclosure are described hereinafter with reference to embodiments and drawings.

Figure 7:
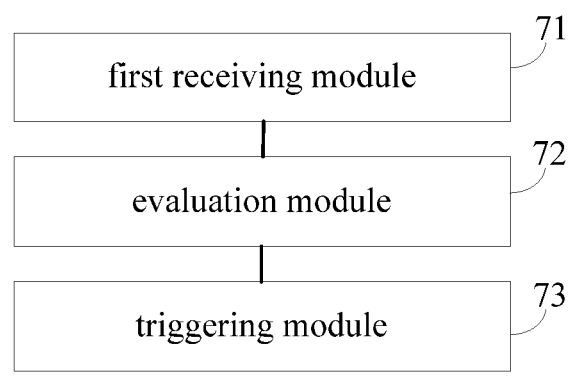
FIG. 7 is a first schematic structural diagram of a terminal device according to an embodiment of the present disclosure.

Referring to FIG. 7, one embodiment of the present disclosure further provides a terminal device, including:

a first receiving module 71 configured to receive conditional SCG change information transmitted by a network node;

an evaluation module 72 configured to, according to the conditional SCG change information, evaluate whether one or more target cells of an SCG meet a condition corresponding to triggering target cell change, to obtain an evaluation result;

a triggering module 73 configured to trigger a SCG target cell changing procedure according to the evaluation result.

In the terminal device according to one embodiment of the present disclosure, the terminal device receives the conditional SCG change information transmitted by the network node; according to the conditional SCG change information, evaluates whether one or more target cells of the SCG meet the condition corresponding to triggering target cell change to obtain the evaluation result; according to the evaluation result, triggers a SCG target cell changing procedure. In this way, the terminal device, on the premise of meeting network configuration conditions, can change the SCG target cell immediately and effectively, thereby reducing the loss of radio interface signaling, reducing the probability of SCG failure, achieving load balance by quickly switching data transmission of the current SCG to other cell groups and then improving utilization efficiency of radio interface resources.

Optionally, the conditional SCG change information may include one or more of the following:

identification information of one or more conditional change target cells;

configuration information of one or more conditional change target cells;

one or more conditions corresponding to triggering target cell change;

one or more condition identification information corresponding to triggering target cell change;

one or more condition action durations corresponding to triggering target cell change.

Optionally, the condition corresponding to triggering target cell change includes one or more of the following:

a measurement result of a target cell reaching or exceeding a preset threshold;

a measurement result of a serving cell reaching or below a preset threshold;

a difference between a measurement result of a serving cell and a measurement result of a target cell reaching or exceeding a preset threshold;

a measurement result of a serving cell reaching or below a first preset threshold, and a measurement result of a target cell reaching or exceeding a second preset threshold.

Optionally, the measurement result may include one or more of the following: RSRP, RSRQ, and SINR.

Optionally, the triggering module 73 is configured to perform one or more of the following:

when the conditional SCG change information includes configuration information of one or more conditional change target cells, configuring according to the configuration information of an SCG target cell that meets the condition corresponding to triggering target cell change;

performing downlink synchronization with the SCG target cell that meets the condition corresponding to triggering target cell change;

initiating a random access procedure in the SCG target cell that meets the condition corresponding to triggering target cell change.

Optionally, the conditional SCG change information includes one or more conditions and one or more condition action durations corresponding to triggering target cell change, the evaluation module 72 is configured to perform:

starting a timer for each condition corresponding to triggering target cell change, where the duration of the timer is one of the condition action durations corresponding to triggering target cell change;

before the timer expires, evaluating whether the corresponding target cell meets the condition corresponding to triggering target cell change to obtain the evaluation result.

Optionally, the terminal device further includes:

a deleting module configured to, in case that at least one timer is started, when the conditional SCG change information includes one or more condition identification information corresponding to triggering target cell change, and when one or more timers of the at least one timer expire, delete, the condition identification information corresponding to triggering target cell change, which is corresponding to the timer that has expired; and/or, in case that at least one timer is started, when the conditional SCG change information includes the configuration information of one or more conditional change target cells, and when one or more timers of the at least one timer expire, delete, the configuration information of the conditional change target cell, which is corresponding to the timer that has expired.

In one embodiment of the present disclosure, the terminal device further includes:

a first transmission module configured to transmit configuration confirmation information to the network node;

where the configuration confirmation information is used by the network node to determine corresponding conditional SCG change confirmation information.

Optionally, the configuration confirmation information may include one or more of the following:

information of rejecting conditional SCG change;

information of agreeing to conditional SCG change.

Optionally, the information of rejecting conditional SCG change includes one or more of the following:

identification information of one or more rejected conditional change target cells;

one or more rejected conditions corresponding to triggering target cell change.

Optionally, the information of agreeing to conditional SCG change includes one or more of the following:

identification information of one or more agreed conditional change target cells;

configuration information of one or more agreed conditional change target cells;

one or more agreed conditions corresponding to triggering target cell change.

Optionally, the network node may be a master node or a source secondary node.

Optionally, the terminal device further includes:

a second transmission module configured to transmit a notification message to the master node or the source secondary node; where the notification message is used to notify the master node or the source secondary node of related information of the changed SCG.

Optionally, the related information of the changed SCG includes one or more of the following:

identification information of one or more conditional change target cells;

one or more satisfied condition identification information corresponding to triggering target cell change;

configuration information of one or more target cells that meet conditional change.

Optionally, the terminal device further includes: a processing module configured to perform one or more of the following:

stopping evaluation of whether one or more target cells of the SCG meet the condition corresponding to triggering target cell change;

deleting one or more conditions corresponding to triggering target cell change;

deleting configuration information of one or more conditional change target cells, which are not changed.

Figure 8:
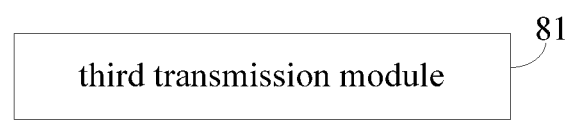
FIG. 8 is a first schematic structural diagram of a network node according to an embodiment of the present disclosure.

Referring to FIG. 8, one embodiment of the present disclosure further provides a network node, including:

a third transmission module 81 configured to transmit conditional SCG change information to a terminal device;

where the conditional SCG change information is used by the terminal device to, according to the conditional SCG change information, evaluate whether one or more target cells of an SCG meet a condition corresponding to triggering target cell change, to obtain an evaluation result, and trigger a SCG target cell changing procedure according to the evaluation result.

In the network node according to one embodiment of the present disclosure, the conditional SCG change information is transmitted to the terminal device, so that the terminal device, according to the conditional SCG change information, evaluates whether one or more target cells of the SCG meet the condition corresponding to triggering target cell change to obtain the evaluation result, and triggers the SCG target cell changing procedure according to the evaluation result. In this way, the terminal device, on the premise of meeting network configuration conditions, can change the SCG target cell immediately and effectively, thereby reducing the loss of radio interface signaling, reducing the probability of SCG failure, achieving load balance by quickly switching data transmission of the current SCG to other cell groups and then improving utilization efficiency of radio interface resources.

Optionally, the network node may be a master node or a source secondary node.

Optionally, the network node is a master node. The network node further includes:

a first transceiver module configured to transmit conditional SCG addition request information to a target secondary node, and receive conditional SCG addition feedback information transmitted by the target secondary node;

where the conditional SCG addition feedback information is used by the master node to determine corresponding conditional SCG change information.

Optionally, the network node further includes:

a second receiving module configured to receive conditional SCG change request information transmitted by a source secondary node;

where the conditional SCG change request information is used by the master node to determine the corresponding conditional SCG addition request information.

Optionally, the conditional SCG change request information includes one or more of the following:

identification information of one or more conditional change target cells;

one or more conditions corresponding to triggering target cell change;

one or more condition identification information corresponding to triggering target cell change;

one or more condition action durations corresponding to triggering target cell change.

Optionally, the network node further includes:

a second transceiver module configured to transmit conditional SCG release indication information to the source secondary node, and receive conditional SCG release confirmation information transmitted by the source secondary node;

where the conditional SCG release indication information is used by the source secondary node to conditionally release SCG cells.

Optionally, the conditional SCG addition request information includes one or more of the following:

identification information of one or more conditional addition target cells;

one or more conditions corresponding to triggering target cell addition;

one or more condition identification information corresponding to triggering target cell addition;

one or more condition action duration corresponding to triggering target cell addition.

Optionally, the condition corresponding to triggering target cell addition includes one or more of the following:

a measurement result of a target cell reaching or exceeding a preset threshold;

a measurement result of a serving cell reaching or below a preset threshold;

a difference between a measurement result of a serving cell and a measurement result of a target cell reaching or exceeding a preset threshold;

a measurement result of a serving cell reaching or below a first preset threshold, and a measurement result of a target cell reaching or exceeding a second preset threshold.

Optionally, the measurement result includes one or more of the following: RSRP, RSRQ, and SINR.

Optionally, the conditional SCG addition feedback information includes one or more of the following:

information of rejecting conditional SCG addition;

information of agreeing to conditional SCG addition.

Optionally, the information of rejecting conditional SCG addition includes one or more of the following:

identification information of one or more rejected conditional addition target cells;

one or more rejected conditions corresponding to triggering target cell addition.

Optionally, the information of agreeing to conditional SCG addition includes one or more of the following:

identification information of one or more agreed conditional addition target cells;

configuration information of one or more agreed conditional addition target cells;

one or more agreed conditions corresponding to triggering target cell addition;

one or more agreed condition action durations corresponding to triggering target cell addition.

Optionally, the network node is a master node. The network node further includes:

a third transceiver module configured to receive configuration confirmation information transmitted by the terminal device; according to the configuration confirmation information, transmit conditional SCG change confirmation information to a source secondary node and a target secondary node.

Optionally, the network node is a source secondary node. The network node further includes:

a fourth transceiver module configured to receive configuration confirmation information transmitted by the terminal device; according to the configuration confirmation information, transmit conditional SCG change confirmation information to a source secondary node and a target secondary node.

Optionally, the network node is a master node. The network node further includes:

a third receiving module configured to receive conditional SCG change indication information transmitted by the target secondary node;

where the conditional SCG change indication information is transmitted by the target secondary node after the target secondary node detects that the terminal device accesses the target cell, and is used to indicate conditional change target cells.

Optionally, the conditional SCG change indication information includes one or more of the following:

identification information of the terminal device;

identification information of one or more target cells that meet conditional change;

configuration information of one or more target cells that meet conditional change;

identification information of target cells.

Optionally, the network node is a master node. The network node further includes:

a fifth transceiver module configured to transmit a release request message to a source secondary node; where the release request message is used by the source secondary node to release resources corresponding to a source SCG cell of the terminal device; and receive a release confirmation message transmitted by the source secondary node.

Optionally, the network node is a source secondary node. The network node further includes:

a sixth transceiver module configured to receive a release request message transmitted by a master node; where the release request message is used by the source secondary node to release resources corresponding to a source SCG cell of the terminal device; and transmit a release confirmation message to the master node.

Optionally, the network node is a master node. The network node further includes:

a fourth transmission module configured to transmit cancellation conditional SCG addition related information to the target secondary node;

where the cancellation conditional SCG addition related information is used by the target secondary node to cancel resources reserved for corresponding conditional SCG addition.

Optionally, the network node is a master node. The network node further includes:

a fourth receiving module configured to receive cancellation conditional SCG addition related information transmitted by a target secondary node;

where the cancellation conditional SCG addition related information is used by the master node to confirm cancellation of corresponding conditional addition SCG cells.

Optionally, the cancellation conditional SCG addition related information includes one or more of the following:

identification information of one or more canceled conditional addition target cells;

one or more canceled condition identification information corresponding to triggering target cell addition;

configuration information of one or more canceled conditional addition target cells;

identification information of the terminal device.

Optionally, the network node further includes:

a fifth transmission module configured to transmit configuration update information to the terminal device;

where the configuration update information is used by the terminal device to cancel corresponding conditional SCG addition related information.

Optionally, the configuration update information includes one or more of the following:

identification information of one or more canceled conditional addition target cells;

one or more canceled condition identification information corresponding to triggering target cell addition;

configuration information of one or more canceled conditional addition target cells.

Optionally, the network node is a master node. The network node further includes:

a sixth transmission module configured to transmit cancellation conditional SCG change related information to a source secondary node; where the cancellation conditional SCG change related information is used by the source secondary node to confirm cancellation of corresponding conditional SCG change cell; or, a fifth receiving module configured to receive cancellation conditional SCG change related information transmitted by the source secondary node; where the cancellation conditional SCG change related information is used by the master node to confirm cancellation of corresponding conditional SCG change cell.

Optionally, the network node is a source secondary node. The network node further includes:

a seventh transmission module configured to transmit cancellation conditional SCG change related information to a master node; where the cancellation conditional SCG change related information is used by the master node to confirm cancellation of corresponding conditional SCG change cell; or, a sixth receiving module configured to receive cancellation conditional SCG change related information transmitted by the master node; where the cancellation conditional SCG change related information is used by the source secondary node to confirm cancellation of corresponding conditional SCG change cell.

Optionally, the cancellation conditional SCG change related information includes one or more of the following:

identification information of one or more canceled conditional change target cells;

one or more canceled condition identification information corresponding to triggering target cell change;

configuration information of one or more canceled conditional change target cells;

identification information of the terminal device.

One embodiment of the present disclosure further provides a terminal device including a processor, a memory, a computer program stored on the memory and executable on the processor. The computer program is executed by the processor to implement various procedures of the secondary cell group maintenance method applied to the terminal device in the foregoing embodiment, with the same technical effect being achieved, which will not be elaborated herein to avoid repetition.

Figure 9:
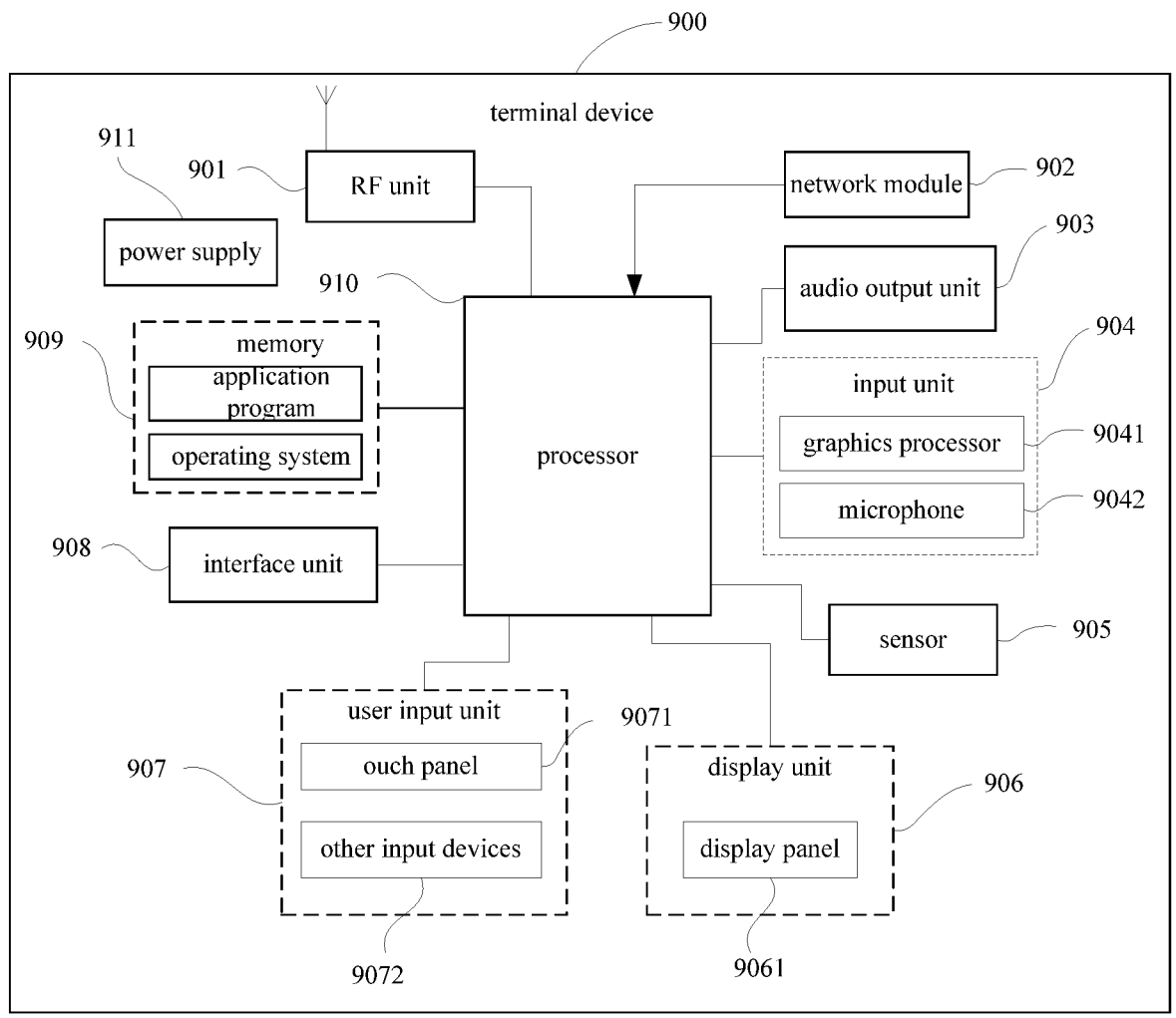
FIG. 9 is a second schematic structural diagram of a terminal device according to an embodiment of the present disclosure.

Specifically, FIG. 9 is a schematic structural diagram of a hardware structure of a terminal device implementing various embodiments of the present disclosure. The terminal device 900 includes, but is not limited to, a radio frequency (RF) unit 901, a network module 902, an audio output unit 903, an input unit 904, a sensor 905, a display unit 906, a user input unit 907, an interface unit 908, a memory 909, a processor 910, and a power supply 911. It will be appreciated by those skilled in the art that structures of the terminal device shown in FIG. 9 do not constitute a limitation of a terminal device, which may include more or fewer components than illustrated, or have some components combined, or different component arrangements. In one embodiment of the present disclosure, the terminal device includes, but is not limited to, a mobile phone, a tablet computer, a notebook computer, a palmtop computer, an in-vehicle terminal, a wearable device, a pedometer, and the like.

The radio frequency unit 901 is configured to receive conditional SCG change information transmitted by a network node.

The processor 910 is configured to, according to the conditional SCG change information, evaluate whether one or more target cells of an SCG meet a condition corresponding to triggering target cell change, to obtain an evaluation result; and trigger a SCG target cell changing procedure according to the evaluation result.

In the terminal device 900 according to one embodiment of the present disclosure, the terminal device receives the conditional SCG change information transmitted by the network node; according to the conditional SCG change information, evaluates whether one or more target cells of the SCG meet the condition corresponding to triggering target cell change to obtain the evaluation result; according to the evaluation result, triggers a SCG target cell changing procedure. In this way, the terminal device, on the premise of meeting network configuration conditions, can change the SCG target cell immediately and effectively, thereby reducing the loss of radio interface signaling, reducing the probability of SCG failure, achieving load balance by quickly switching data transmission of the current SCG to other cell groups and then improving utilization efficiency of radio interface resources.

It should be understood that in some embodiments of the present disclosure, the radio frequency unit 901 may be used to receive and transmit signals during receiving and transmitting information or a call. Specifically, the radio frequency unit 901 receives downlink data from a base station and then transmits the downlink data to the processor 910 for processing. Uplink data is transmitted to the base station. Generally, the radio frequency unit 901 includes, but is not limited to, an antenna, at least one amplifier, a transceiver, a coupler, a low noise amplifier, a duplexer, and the like. In addition, the radio frequency unit 901 may also communicate with the network and other devices through a wireless communication system.

The terminal device provides wireless broadband internet access to the user through the network module 902, such as assisting the user in receiving and transmitting email, browsing web pages, and accessing streaming media.

The audio output unit 903 may convert the audio data received by the radio frequency unit 901 or the network module 902 or stored in the memory 909 into an audio signal and output as sound. Moreover, the audio output unit 903 may also provide audio output (e.g., call signal reception sound, message reception sound, etc.) related to a specific function performed by the terminal device 900. The audio output unit 903 includes a speaker, a buzzer, a receiver, and the like.

The input unit 904 is used for receiving an audio or video signal. The input unit 904 may include a graphics processing unit (Graphics Processing Unit, GPU) 9041 and a microphone 9042. The GPU 9041 processes image data of static pictures or videos obtained by an image capturing apparatus (such as a camera) in a video capturing mode or an image capturing mode. The processed image frame may be displayed on the display unit 906. The image frames processed by the graphics processor 9041 may be stored in the memory 909 (or other storage medium) or transmitted via the radio frequency unit 901 or the network module 902. The microphone 9042 can receive sound and can process such sound into audio data. The processed audio data may be converted into a format output that may be transmitted to the mobile communication base station via the radio frequency unit 901 in the case of a telephone talk mode.

The terminal device 900 further includes at least one sensor 905, such as a light sensor, a motion sensor, and other sensors. Specifically, the light sensor includes an ambient light sensor and a proximity sensor. The ambient light sensor can adjust brightness of a display panel 9061 according to the brightness of the ambient light. The proximity sensor can turn off the display panel 9061 and/or backlight when the terminal device 900 moves to the ear. As one of the motion sensors, an accelerometer sensor can detect the magnitude of the acceleration in each direction (generally three axes), can detect the magnitude and direction of the gravity when stationary, and can be used to identify the attitude of the terminal device (such as horizontal/vertical screen switching, related games, magnetometer attitude calibration), vibration identification related functions (such as pedometer, knocking), and the like. The sensor 905 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 906 is used to display information input by or provided to the user. The display unit 906 may include a display panel 9061, which may be configured in the form of a Liquid Crystal Display (Liquid Crystal Display, LCD), an Organic Light-Emitting Diode (Organic Light-Emitting Diode, OLED), or the like.

The user input unit 907 may be used to receive the input number or character information, and to generate a key signal input related to the user setting and the function control of the terminal device. Specifically, the user input unit 907 includes a touch panel 9071 and other input devices 9072. The touch panel 9071, also referred to as a touch screen, may collect touch operations on or near the touch panel (e.g., operations on or near the touch panel 9071 using any suitable object or accessory, such as a finger, stylus, or the like). The touch panel 9071 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 910, receives commands from the processor 910 and execute them. In addition, the touch panel 9071 may be implemented in various types such as a resistive type, a capacitive type, an infrared ray, and a surface acoustic wave. In addition to the touch panel 9071, the user input unit 907 may further include other input devices 9072. Specifically, other input devices 9072 may include, but are not limited to, a physical keyboard, a function key (such as a volume control key, an on-off key), a trackball, a mouse, and a joystick, which will not be elaborated herein.

Further, the touch panel 9071 may be overlaid on the display panel 9061. When the touch panel 9071 detects a touch operation on or near the touch panel, the touch panel 9071 transmits it to the processor 910 to determine a type of a touch event. Then, the processor 910 provides a corresponding visual output on the display panel 9061 according to the type of the touch event. Although in FIG. 9, the touch panel 9071 and the display panel 9061 are implemented as two separate components to implement the input and output functions of the terminal device, in some embodiments, the touch panel 9071 and the display panel 9061 may be integrated to implement the input and output functions of the terminal device, which are not specifically limited herein.

The interface unit 908 is an interface through which an external device is connected to the terminal device 900. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 908 may be used to receive input (e.g., data information, power, etc.) from the external device and transmit the received input to one or more elements within the terminal device 900 or may be used to transmit data between the terminal device 900 and the external device.

The memory 909 may be used to store software programs and various data. The memory 909 may mainly include a program storage area and a data storage area. The program storage area may store an operating system, an application program (such as a sound play function, an image play function) required by at least one function, and the like. The data storage area may store data (such as audio data, a phone book) created according to use of the terminal device. In addition, the memory 909 may include high speed random access memory, and may also include non-volatile memory, such as at least one magnetic disk storage device, flash memory device, or other volatile solid state storage device.

The processor 910 is a control center of the terminal device, connects various parts of the entire terminal device by various interfaces and lines, executes various functions of the terminal device and processes data by running or executing software programs and/or modules stored in the memory 909 and invoking data stored in the memory 909, thereby performing overall monitoring of the terminal device. The processor 910 may include one or more processing units. Optionally, the processor 910 may integrate an application processor and a modem processor. The application processor primarily processes the operating system, the user interface and the application program. The modem processor primarily processes wireless communications. It will be appreciated that the modem processor may also not be integrated into the processor 910.

The terminal device 900 may further include a power source 911 (such as a battery) that supplies power to the various components. Optionally, the power source 911 may be logically connected to the processor 910 through a power management system to perform functions such as managing charging, discharging, and power consumption management through the power management system.

In addition, the terminal device 900 includes functional modules not shown, which will not be elaborated herein.

Optionally, one embodiment of the present disclosure further provides a network node including a processor, a memory, and a computer program stored in the memory and executable on the processor. The computer program is executed by the processor to implement various procedures of the secondary cell group maintenance method applied to the network node in the foregoing embodiment, with the same technical effect being achieved, which will not be elaborated herein to avoid repetition.

Figure 10:
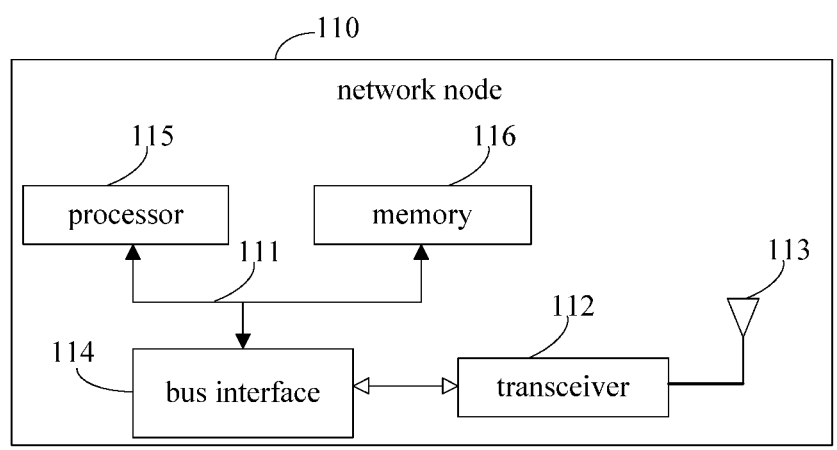
FIG. 10 is a second schematic structural diagram of a network node according to an embodiment of the present disclosure.

Specifically, FIG. 10 is a schematic diagram of a network node according to an embodiment of the present disclosure. The network node 110 includes: a bus 111, a transceiver 112, an antenna 113, a bus interface 114, a processor 115, and a memory 116.

In one embodiment of the present disclosure, the network node 110 further includes a computer program stored in the memory 116 and executable on the processor 115. The computer program is executed by the processor 115 to implement the following steps: transmitting conditional SCG change information to a terminal device.

The conditional SCG change information is used by the terminal device to, according to the conditional SCG change information, evaluate whether one or more target cells of an SCG meet a condition corresponding to triggering target cell change, to obtain an evaluation result, and trigger a SCG target cell changing procedure according to the evaluation result.

The transceiver 112 is configured to receive and transmit data under the control of the processor 115.

In FIG. 10, the bus architecture (represented by the bus 111) may include any number of interconnected buses and bridges. Specifically, various circuits of one or more processors, which are represented by the processor 115, and the storage, which is represented by the memory 116, are linked together by the bus 111. The bus 111 may link various other circuits, such as a peripheral device, voltage regulator and a power management circuit together. These features are well known in this field, therefore, this disclosure does not make further description on these features. The bus interface 114 provides an interface between the bus 111 and the transceiver 112. The transceiver 112 may be one element or multiple elements, such as multiple receivers and transmitters, and provide units, which communicate with other devices on the transmission medium. Data processed by the processor 115 is transmitted on wireless medium through the antenna 113, and further, the antenna 113 also receives data and transmits the data to the processor 115.

The processor 115 is responsible for managing the bus 111 and common processing, and can further provide various functions, including timing, peripheral interfaces, voltage regulation, power management and other control functions. The memory 116 may be used to store data used by the processor 115 when executing the operations.

Optionally, the processor 115 may be CPU, ASIC, FPGA, or CPLD.

One embodiment of the present disclosure further provides a computer readable storage medium including a computer program stored thereon. The computer program is executed by a processor to implement various procedures of the secondary cell group maintenance method applied to the terminal device in the foregoing embodiment and the same technical effect can be achieved. To avoid repetition, details are not described herein. The computer readable storage medium may be, such as a read-only memory (Read-Only Memory, ROM), a random access memory (Random Access Memory, RAM), a magnetic disk, or an optical disk.

One embodiment of the present disclosure further provides a computer readable storage medium including a computer program stored thereon. The computer program is executed by a processor to implement various procedures of the secondary cell group maintenance method applied to the network node in the foregoing embodiment and the same technical effect can be achieved. To avoid repetition, details are not described herein. The computer readable storage medium may be, such as a read-only memory (Read-Only Memory, ROM), a random access memory (Random Access Memory, RAM), a magnetic disk, or an optical disk.

It should also be noted that in the present disclosure, the terms "comprise", "include" or any other variations are intended to encompass a non-exclusive inclusion, such that a process, method, commodity, or device that include a series of elements include not only those elements but also other elements that are not explicitly listed, or elements that are inherent to such process, method, commodity, or device. Without more restrictions, an element defined by the phrase "include a . . . " does not exclude the presence of an additional equivalent element in the process, method, commodity, or device including the element.

Through the description of the above embodiments, those skilled in the art can clearly understand that the methods in the above embodiments may be implemented by means of software plus a necessary general hardware platform, and of course, may also be implemented by hardware, but in many cases the former is better implementation. Based on such an understanding, the technical solution of the present disclosure in essence, or a part that contributes to related technologies, may be embodied in the form of a software product. The computer software product may be stored in a storage medium (such as ROM/RAM, magnetic disk, optical disk), and includes multiple instructions to enable a terminal (which may be a mobile phone, a computer, a server, an air conditioner, or a network node, etc.) to execute the method described in various embodiments of the present disclosure.

The embodiments of the present disclosure have been described above with reference to the drawings, but the present disclosure is not limited to the specific embodiments described above, and the specific embodiments described above are merely illustrative and not restrictive. In the light of the present disclosure, those skilled in the art may make many variations without departing from the sprit and the protection scope of the claims, which fall within the protection of the present disclosure.

What is claimed is:

1. A secondary cell group (SCG) maintenance method, performed by a terminal device in a dual-connectivity with a master node (MN) and a source secondary node (SN), comprising:
   receiving conditional SCG change information transmitted by the MN when a conditional SCG change procedure is triggered by the SN; wherein the MN is a node corresponding to a master cell group (MCG), and the SN is a node corresponding to an SCG;
   evaluating, according to the conditional SCG change information, whether one or more target cells of the SCG meet a condition for triggering target cell change, to obtain an evaluation result;
   according to the evaluation result, triggering a SCG target cell changing procedure;
   wherein the conditional SCG change information comprises configuration information of one or more conditional change SCG target cells, and one or more conditions for triggering target cell change;
   the triggering a SCG target cell changing procedure comprises: configuring according to configuration information of an SCG target cell whose corresponding condition for triggering target cell change, is satisfied;
   wherein the conditional SCG change information further comprises: one or more condition action durations corresponding to triggering target cell change;
   the condition for triggering target cell change comprises: a measurement result of a serving cell reaching or below a first preset threshold, and a measurement result of a target cell reaching or exceeding a second preset threshold; and the first preset threshold is different from the second preset threshold.

2. The method according to claim 1, wherein the conditional SCG change information further comprises one or more of the following:
   identification information of one or more conditional change target cells;
   one or more condition identification information corresponding to triggering target cell change.

3. The method according to claim 2, wherein the condition for triggering target cell change further comprises one or more of the following:
   a measurement result of a target cell reaching or exceeding a preset threshold;
   a measurement result of a serving cell reaching or below a preset threshold;
   a difference between a measurement result of a serving cell and a measurement result of a target cell reaching or exceeding a preset threshold.

4. The method according to claim 2, wherein the triggering a SCG target cell changing procedure further comprises one or more of the following:
   performing downlink synchronization with the SCG target cell whose corresponding condition for triggering target cell change, is satisfied;
   initiating a random access procedure in the SCG target cell whose corresponding condition for triggering target cell change, is satisfied.

5. The method according to claim 2, wherein the conditional SCG change information comprises one or more conditions and condition action durations corresponding to triggering target cell change;
   evaluating, according to the conditional SCG change information, whether one or more target cells of an SCG meet a condition for triggering target cell change, to obtain an evaluation result, comprises:
   starting a timer for each condition for triggering target cell change, wherein a duration of the timer is one of the condition action durations corresponding to triggering target cell change;
   before a timer for a condition expires, evaluating whether the corresponding target cell meets the condition for triggering target cell change to obtain the evaluation result.

6. The method according to claim 5, wherein in the case that at least one timer is started, the method further comprises one or more of the following:
   when the conditional SCG change information comprises one or more condition identification information corresponding to triggering target cell change, and when one or more timers of the at least one timer expires, deleting, the condition identification information corresponding to triggering target cell change, which is corresponding to the timer that has expired;
   when the conditional SCG change information comprises configuration information of one or more conditional change target cells, and when one or more timers of the at least one timer expires, deleting, the configuration information of the conditional change target cell, which is corresponding to the timer that has expired.

7. The method according to claim 1, wherein after receiving the conditional SCG change information transmitted by the master node, the method further comprises:
   transmitting configuration confirmation information to the master node;
   wherein the configuration confirmation information is used by the master node to determine corresponding conditional SCG change confirmation information.

8. The method according to claim 7, wherein the configuration confirmation information comprises one or more of the following:
   information of rejecting conditional SCG change;
   information of agreeing to conditional SCG change.

9. The method according to claim 8, wherein the information of rejecting conditional SCG change comprises one or more of the following:
   identification information of one or more rejected conditional change target cells;
   one or more rejected conditions for triggering target cell change;
   wherein the information of agreeing to conditional SCG change comprises one or more of the following:
   identification information of one or more agreed conditional change target cells;
   configuration information of one or more agreed conditional change target cells;
   one or more agreed conditions for triggering target cell change.

10. The method according to claim 1, wherein after the evaluation result is obtained, the method further comprises:
    transmitting a notification message to the master node or the source secondary node;

wherein the notification message is used to notify the master node or the source secondary node of related information of the SCG changed by the terminal device;

wherein the related information of the SCG changed by the terminal device comprises one or more of the following:

identification information of one or more conditional change target cells;

one or more satisfied condition identification information corresponding to triggering target cell change;

configuration information of one or more target cells that meet conditional change.

11. The method according to claim 1, wherein after the triggering a SCG target cell changing procedure, the method further comprises one or more of the following:

stopping evaluation of whether one or more target cells of the SCG meet the condition for triggering target cell change;

deleting one or more conditions for triggering target cell change;

deleting configuration information of one or more conditional change target cells, which are not changed.

12. A secondary cell group (SCG) maintenance method, performed by a master node (MN), comprising:

transmitting conditional SCG change information to a terminal device in a dual- connectivity with the MN and a source secondary node (SN) when a conditional SCG change procedure is triggered by the SN; wherein the MN is a node corresponding to a master cell group (MCG), and the SN is a node corresponding to an SCG;

wherein the conditional SCG change information comprises configuration information of one or more conditional change SCG target cells, and one or more conditions for triggering target cell change;

wherein the conditional SCG change information further comprises: one or more condition action durations corresponding to triggering target cell change;

the condition for triggering target cell change comprises: a measurement result of a serving cell reaching or below a first preset threshold, and a measurement result of a target cell reaching or exceeding a second preset threshold; and the first preset threshold is different from the second preset threshold.

13. The method according to claim 12, wherein before the transmitting conditional SCG change information to a terminal device, the method further comprises:

transmitting conditional SCG addition request information to a target secondary node;

receiving conditional SCG addition feedback information transmitted by the target secondary node;

wherein the conditional SCG addition feedback information is used by the master node to determine corresponding conditional SCG change information.

14. The method according to claim 13, wherein before the transmitting conditional SCG addition request information to a target secondary node, the method further comprises:

receiving conditional SCG change request information transmitted by the source secondary node;

wherein the conditional SCG change request information is used by the master node to determine the corresponding conditional SCG addition request information;

wherein the conditional SCG change request information comprises one or more of the following:

identification information of one or more conditional change target cells;

one or more conditions for triggering target cell change;

one or more condition identification information corresponding to triggering target cell change;

one or more condition action durations corresponding to triggering target cell change.

15. The method according to claim 13, wherein before the transmitting conditional SCG change information to a terminal device, the method further comprises:

transmitting conditional SCG release indication information to the source secondary node;

wherein the conditional SCG release indication information is used by the source secondary node to conditionally release SCG cells;

receiving conditional SCG release confirmation information transmitted by the source secondary node.

16. The method according to claim 13, wherein the conditional SCG addition request information comprises one or more of the following:

identification information of one or more conditional addition target cells;

one or more conditions for triggering target cell addition;

one or more condition identification information corresponding to triggering target cell addition;

one or more condition action duration corresponding to triggering target cell addition;

wherein the condition corresponding to triggering target cell addition comprises one or more of the following:

a measurement result of a target cell reaching or exceeding a preset threshold;

a measurement result of a serving cell reaching or below a preset threshold;

a difference between a measurement result of a serving cell and a measurement result of a target cell reaching or exceeding a preset threshold;

a measurement result of a serving cell reaching or below a first preset threshold, and a measurement result of a target cell reaching or exceeding a second preset threshold.

17. A terminal device, comprising: a memory, a processor, and a computer program stored on the memory and executable on the processor; wherein the computer program is executed by the processor to implement steps of:

receiving conditional secondary cell group (SCG) change information transmitted by a master node (MN) when a conditional SCG change procedure is triggered by a source secondary node (SN); wherein the MN is a node corresponding to a master cell group (MCG), and the SN is a node corresponding to an SCG;

evaluating, according to the conditional SCG change information, whether one or more target cells of the SCG meet a condition corresponding to triggering target cell change, to obtain an evaluation result;

according to the evaluation result, triggering a SCG target cell changing procedure;

wherein the conditional SCG change information comprises configuration information of one or more conditional SCG change target cells, and one or more conditions for triggering target cell change;

the triggering a SCG target cell changing procedure comprises: configuring according to configuration information of an SCG target cell whose corresponding condition for triggering target cell change, is satisfied;

wherein the conditional SCG change information further comprises: one or more condition action durations corresponding to triggering target cell change;

the condition for triggering target cell change comprises: a measurement result of a serving cell reaching or below a first preset threshold, and a measurement result of a target cell reaching or exceeding a second preset threshold; and the first preset threshold is different from the second preset threshold.

18. The terminal device according to claim 17, wherein the conditional SCG change information further comprises one or more of the following:
  identification information of one or more conditional change target cells;
  one or more condition identification information corresponding to triggering target cell change;
  wherein the condition for triggering target cell change comprises one or more of the following:
  a measurement result of a target cell reaching or exceeding a preset threshold;
  a measurement result of a serving cell reaching or below a preset threshold;
  a difference between a measurement result of a serving cell and a measurement result of a target cell reaching or exceeding a preset threshold.

19. The terminal device according to claim 17, wherein the measurement result of the serving cell reaching or below the first preset threshold, and the measurement result of the target cell reaching or exceeding the second preset threshold, comprises:
  a measurement result of a current SCG which is the serving cell, cell reaching or below the first preset threshold, and a measurement result of a neighboring cell which is the target cell, reaching or exceeding the second preset threshold.

* * * * *